United States Patent [19]

Hasegawa et al.

[11] 4,362,450
[45] Dec. 7, 1982

[54] TORQUE STABILIZING METHOD FOR FASTENERS AND TORQUE STABILIZED FASTENERS

[75] Inventors: Shiro Hasegawa; Sanehiro Gima, both of Nagoya, Japan

[73] Assignee: Nippon Oil and Fats Co. Ltd., Tokyo, Japan

[21] Appl. No.: 199,550

[22] Filed: Oct. 22, 1980

Related U.S. Application Data

[63] Continuation-in-part of Ser. No. 40,044, May 17, 1979, abandoned.

[30] Foreign Application Priority Data

May 18, 1978 [JP] Japan .................................. 53-59587
Nov. 7, 1978 [JP] Japan ................................. 53-137608

[51] Int. Cl.³ ........................ F16B 39/22; B05D 3/02
[52] U.S. Cl. .................................. 411/258; 427/208.4;
427/388.2; 427/388.3; 427/388.4; 427/388.5;
411/1; 411/301; 411/903
[58] Field of Search ................... 411/1, 301, 903, 257,
411/258, 904, 907, 908, 6, 82, 428, 512, 532,
390; 10/106, 10 R, 10 P, 86 A; 252/DIG. 1,
DIG. 2, 351, 353, 356, 357, 49.5, 12, 524;
156/91, 332, 66, 293; 106/36, 161, 170; 260/22
R, 22 M, 22 T, 22 A, 29.3, 6, 29.6 R, 29.6 H,
29.6 SQ, 29.6 RW, 29.6 RB; 427/385.5, 388.1,
388.2, 388.3, 388.4, 388.5, 208.4, 398.1

[56] References Cited

U.S. PATENT DOCUMENTS

| | | | |
|---|---|---|---|
| 2,939,805 | 6/1960 | Johnson | 411/301 X |
| 3,146,142 | 8/1964 | Maly | 156/91 |
| 3,419,512 | 12/1968 | Lees | 260/29.7 R |
| 3,485,132 | 12/1969 | Hanny et al. | 411/903 X |
| 3,522,177 | 7/1970 | Benz | 252/23 |
| 3,711,347 | 1/1973 | Wagner | 156/91 |
| 3,755,828 | 9/1973 | Fravenglass et al. | 138/145 |
| 3,814,156 | 6/1974 | Bachmann et al. | 428/357 X |
| 3,853,606 | 12/1974 | Parkinson | 411/903 X |
| 3,915,869 | 10/1975 | Katono et al. | 252/12 |
| 3,983,304 | 9/1976 | Sekhon | 427/388.3 X |
| 4,018,333 | 4/1977 | Blackwood | 411/903 X |

FOREIGN PATENT DOCUMENTS

1149944 4/1969 United Kingdom.

Primary Examiner—Thurman K. Page
Attorney, Agent, or Firm—Cooper, Dunham, Clark, Griffin & Moran

[57] ABSTRACT

The torque of fasteners, such as bolts, nuts and the like, is stabilized by a torque stabilizing agent comprising an organic film forming material and about 2% to about 25% by weight of a surface active agent. Applying the torque stabilizing agent to a fastener prevents defect of the fastening part, such as disconnection or damage.

3 Claims, 14 Drawing Figures

TORQUE STABILIZING METHOD FOR FASTENERS AND TORQUE STABILIZED FASTENERS

This application is a continuation-in-part of application Ser. No. 40,044, filed May 17, 1979 now abandoned.

BACKGROUND OF THE INVENTION

1. Field of the Invention

The invention relates to a torque stabilizing agent, to a torque stabilizing method for fasteners, and to torque stabilized fasteners. More particularly, the invention relates to a torque stabilizing agent which comprises an organic film forming material and about 2% to about 25% by weight of a surface active agent, to a torque stabilizing method for fasteners in which said torque stabilizing agent is employed, and to fasteners whose torque has been stabilized by said torque stabilizing method.

A fixed relation between the fastening torque and the axial force (the fastening force) is desirable when bodies are fastened together with fasteners, such as bolts, nuts and the like, in order to prevent the defect of said fastening parts. The relation between the fastening torque and the axial force is generally represented by the following formula $$\mu = \frac{2T/Q - P/\pi}{de/\cos\alpha + dN} \quad (1)$$

wherein T is the fastening torque, Q is the axial force, $\mu$ is the coefficient of friction between the fastener and the body it is fastened to, P is the pitch of the thread, de is the pitch diameter of the thread and dN is the friction diameter.

Referring to formula (1), it is clear that the relation between the fastening torque and the axial force depends on the coefficient of surface friction of the fastener. Therefore, it is essential to stabilize or fix the coefficient of surface friction in order to fix the relation between the fastening torque and the axial force. However, the coefficient of surface friction of the fastener is remarkably dependent on the surface condition of the fastener. For example, treatment of the fastener surfaces, such as by zinc plating, by phosphate treatment, by zinc chromate treatment and the like, treatment of the fastener surfaces with an adherant, such as machine oil, cleaning materials and the like, and corrosion on the fastener surfaces determine the surface condition and, hence, effect the coefficient of surface friction of the fastener.

The relation between the fastening torque and the axial force changes according to the change of the coefficient of surface friction as is shown by formula (1), and so it is difficult to stabilize the torque of the fastener without regard to the surface conditions. Therefore, the defect of the fastening part, such by disconnection, damage and the like, may not be avoidable when the surface conditions of the fastener varies.

It should be understood that a torque stabilizing agent prevents disconnection of or damage to fasteners by maintaining a fixed relationship between the fastening torque and the axial force regardless of the surface conditions. This is accomplished by maintaining a fixed coefficient of friction between the surfaces in contact with each other regardless of their conditions.

It should also be understood that a useful torque stabilizing agent should provide a coefficient of surface friction which is neither too high nor too low. If the coefficient of friction is too low, the fastening parts will become too easily disconnected. To prevent disconnection, a workman may apply excessive torque, which can result in damage to or rupture of the fastening parts. On the other hand, if the coefficient of friction is too high, fastening the parts together will be difficult. Again, a workman is likely to apply too much torque, which can result in damage to or rupture of the fastening parts. Furthermore, a composition which cures after application will prevent disconnection of the fastening parts even when such disconnection is desired.

That the coefficient of friction should be neither too high nor too low may also be demonstrated by referring to formula (1). It may be seen that Q (the axial force) is a linear function of T (the fastening torque), the slope of which includes $1/\mu$ (the coefficient of surface friction). Q changes very rapidly with T when the value of $\mu$ is low, but very slowly when the value of $\mu$ is high. Therefore, for low values of $\mu$, it is very difficult to control Q. A small increase of T will result in rupture of the fastener, while a small decrease of T will result in disconnection of the fastener. On the other hand, for high values of $\mu$, it is very difficult to achieve a sufficiently high value of Q by increasing T. Thus, the rupture point of the fastener will be reached over a wide range of values for T while Q remains low.

Thus, an optimum range exists for the coefficient of surface friction in order to achieve a preferable fastening state. The optimum range for the coefficient of surface friction is generally about 0.1 to 0.2.

The torque stabilizing agent of this invention is employed to stabilize or fix the coefficient of surface friction of the fastener within the optimum range regardless of the surface conditions. It thus prevents the defect of the fastening part.

2. Description of the Prior Art

Hitherto, a few kinds of torque stabilizing agents have been proposed to stabilize the relation between the fastening torque and the axial force. One of them is a kind of lubricant such as silicone oil, paraffin oil, wax and the like. Said lubricant is not satisfactory. It tends to degenerate in the atmosphere. The bond between said lubricant and the surface of the fastener is very low so said lubricant is easy to peel from the surface of the fastener. Furthermore, it provides a coefficient of friction which is too low. A kind of synthetic resin paste has also been proposed as a torque stabilizing agent. Said synthetic resin paste also is not satisfactory. It has high viscosity and the thread of the fastener is filled up by said synthetic resin paste. It is very difficult to screw in a fastener when the thread is filled up with the synthetic paste. Moreover, it is necessary to prevent said synthetic resin paste from adhering to the head of the fastener because it is difficult to fit the clamping tool, such as spanner, wrench and the like, onto a fastener head to which said synthetic resin paste adheres.

SUMMARY OF THE INVENTION

An object of this invention is to provide a novel torque stabilizing agent, a novel torque stabilizing method for fasteners and a new torque stabilized fastener. A further object of this invention is to prevent the defect of fastening parts by employing said torque stabilized fasteners which are treated by said torque stabilizing method employing said torque stabilizing agent. A further object of this invention is to provide a torque stabilizing agent which provides a coefficient of surface friction between a fastener and another body within the range of about 0.1 to 0.2 regardless of the surface conditions.

Said objects can be attained with a novel torque stabilizing agent comprising about 2% to about 25% by weight of a surface active agent and an organic film forming material selected from the group consisting of acryl resins, methacrylic resins, vinyl acetate resins, styrol resins, vinyl ether resins, vinyl chloride resins, vinylidene chloride resins, vinyl pyrrolidone resins, polyvinyl alcohol, acetal resins, butyryl resins; condensation polymers such as phenol resins, alkyd resins, melamine resins, polyamide resins, polyurethane resins; cellulose derivatives such as methylcellulose, hydroxyethyl cellulose, carboxymethyl cellulose, ethylcellulose, cellulose nitrate, cellulose acetate, cellulose butyrate; rubbers such as styrene-butadiene rubber, acrylonitrilebutadiene rubber, isoprene rubber, butyl rubber, polybutadiene polychloroprene rubber, thiokol rubber, natural rubber, and their reclaimed rubbers; petroleum resins, cumarone resins, terpene resins, rosin and derivatives thereof, starch, denatured starch, proteins and denatured proteins.

The organic film forming material serves as a vehicle for the surface active agent. The film forming material forms a film which has strong mechanical properties and large bonding strength with the surface of the fastener.

The surface active agent, which acts as a kind of lubricant to control the coefficient of friction, is strongly adhered to the surface of the fastener by the film forming material. The torque stabilizing agent must contain a sufficient amount of the surface active agent to serve its function to control the coefficient of friction. Thus, the concentration of surface active agent must be in the range of about 2% to about 25% by weight. Together, the organic film forming material and the surface active agent in the amount specified, provide a coefficient of surface friction within the optimal range of about 0.1 to 0.2.

DETAILED DESCRIPTION OF THE PREFERRED EMBODIMENTS

The invention relates to a torque stabilizing agent comprising an organic film forming material and about 2% to 25% by weight of a surface active agent. Said torque stabilizing agent is adhered to the surface of the fastener.

The fastener which is treated by said torque stabilizing agent of the invention is the implement which fastens one body to another body, and includes a bolt, screw, nut, washer and the like. The fastener is conventionally made from a metal or alloy, such as iron, stainless steel, aluminum, brass and the like.

The film forming material acts as a vehicle for the surface active agent to bind it to the fastener surfaces. The nature of the film forming materials markedly affects the value of the coefficient of friction. Therefore, the film forming material must be chosen carefully to obtain a torque stabilizing agent giving preferable values of the coefficient of friction.

Thus, polytetrafluoroethylene and polyethylene, because of their lubricating abilities, are not suitable film forming materials. Similarly, epoxy resins, because of their curing properties, are not suitable film forming materials either.

The organic film forming material and the surface active agent together must produce a coefficient of friction within the optimal range of about 0.1 to about 0.2. Suitable film forming materials which can be used for said torque stabilizing agent include many different type of polymers. Said polymers include acryl resins, methacrylic resins, vinyl acetate resins, styrol resins, vinyl ether resins, vinyl chloride resins, vinylidene chloride resins, vinyl pyrrolidone resins, polyvinyl alcohol, acetal resins, butyryl resins; condensation polymers such as phenol resins, alkyd resins, melamine resins, polyamide resins, polyurethane resins; cellulose derivatives such as methylcellulose, hydroxyethyl cellulose, carboxymethyl cellulose, ethylcellulose, cellulose nitrate, cellulose acetate, cellulose butyrate; rubbers such as styrene-butadiene rubber, acrylonitrilebutadiene rubber, isoprene rubber, butyl rubber, polybutadiene polychloroprene rubber, thiokol rubber, natural rubber, and their reclaimed rubbers; and petroleum resins, cumarone resins, terpene resins, rosin and derivatives thereof, starch, denatured starch, proteins and denatured protein.

Of the film forming materials mentioned, it is possible to mix two or more of the polymers together in preparing a suitable torque stabilizing agent.

Water soluble polymers and/or water emulsified polymers are especially preferable for the invention. Suitable water soluble polymers include polymers of water soluble monomers such as acrylic acid, methacrylic acid, itaconic acid, crotonic acid, maleic acid, fumaric acid, citraconic acid, salts of said $\alpha$-$\beta$ unsaturated fatty acid, acrylic amide, methacrylic amide, itaconic amide, crotonic amide, methylol compound of said $\alpha$-$\beta$ unsaturated amide, monoester of $\alpha$-$\beta$ unsaturated fatty acid, and polyhydric alcohols such as ethylene glycol, propylene glycol, pinacol, glycerol, erythritol, pentitol and the like, glycidyl acrylate, glycidyl methacrylate, glycidyl allylether, di-methyl-amino-ethyl methacrylate, di-methylamino-ethyl acrylate, di-ethyl-amino-propyl methacrylate, di-ethyl-amino-propyl acrylate, and the like, reciprocal copolymers of two or more kinds of said water soluble monomers, copolymers of said water soluble monomers and oil soluble monomers such as methyl acrylate, ethyl acrylate, n-butyl acrylate, 2-ethyl-hexyl acrylate, methyl methacrylate, ethyl methacrylate, n-butyl methacrylate, styrol, acrylonitrile, methacrylonitrile, vinyl acetate, vinyl propionate, ethyl vinyl ether, isopropionic vinyl ether, n-butyl vinyl ether, vinyl chloride, vinylidene chloride and the like wherein said copolymer includes a sufficient amount of said water soluble derivatives of polymers such as polyvinyl amine, polyvinyl alcohol, polymethylol acrylic amide, polymethylol methacrylate amide and the like, water soluble condensation polymers or water soluble addition polymers such as water soluble alkyd resin, water soluble urethane resin, water soluble melamine resin, water soluble urea resin, water soluble phenol resin, water soluble resorcinol resin and the like, alginic acid, salts of alginic acid, carboxymethyl cellulose, water soluble resin, natural water soluble polymers such as gum arabic starch, casein, gelatin and the like, and derivatives of said natural water soluble polymer and the like.

Water emulsified polymers include latexes or emulsions of water insoluble polymer such as acryl resins, methacrylate resins, vinyl acetate resins, styrol resins, vinyl ether resins, vinyl chloride resins, vinylidene chloride resins, vinyl pyrrolidone resins, acetal resins, butyryl resins and the like; condensation polymers such as phenol resins, alkyd resins, melamine resins, polyamide resins, polyurethane resins and the like, rubbers such as styrene-butadiene rubber, acrylonitrile-butadiene rubber, isoprene rubber, butyl rubber, polybutadiene polychloroprene rubber, thiokol rubber, natural rubber and their reclaimed rubbers; and petroleum resins, cumarone resins, terpene resins, rosin and derivatives thereof.

It is preferable to employ the surface active agent of the invention also as the emulsifier of said water insoluble polymers.

It is also preferable to select as a film forming material nonionic, weakly anionic, or weakly cationic water soluble polymers and/or water suspended polymers, or alkaline water soluble polymers such as polyacryl amide, polymethacryl amide, polyvinyl alcohol, water soluble alkyd resin, water soluble urethane resin, amine salts of polymers of $\alpha$-$\beta$ unsaturated fatty acid, carboxymethyl cellulose, casein, gelatin and the like, or alkaline water suspended polymers such as emulsions stabilized with sodium hydroxide, ammonia, amine and the like. The nonionic, weakly anionic or weakly cationic water soluble polymers and water suspended polymers are preferred because they are not highly corrosive to the metal surface. Torque stabilizing agents which contain said water soluble polymers and water emulsified polymers are easy to handle even in large amounts because the main solvent of said torque stabilizing agents is water.

The surface active agent, which is the other component and comprises about 2% to about 25% by weight of said torque stabilizing agent of the invention, is a compound having both a hydrophobic radical and a hydrophilic radical in the same molecule. The surface active agent may be an anionic surface active agent such as salts of alkyl or alkenyl sulfates, for example octyl sulfate, decyl sulfate, dodecyl sulfate, tridecyl sulfate, tetradecyl sulfate, hexadecyl sulfate, octadecyl sulfate, oleyl sulfate and the like, salts of polyoxyalkylene alkyl, alkenyl or alkylphenyl ether sulfate, for example polyoxyethylene octyl ether sulfate, polyoxyethylene decyl ether sulfate, polyoxyethylene dodecyl ether sulfate, polyoxyethylene tridecyl ether sulfate, polyoxyethylene hexadecyl ether sulfate, polyoxyethylene octadecyl ether sulfate, polyoxyethylene oleyl ether sulfate, polyoxyethylene polyoxypropylene dodecyl ether sulfate, polyoxyethylene polyoxypropylene hexadecyl ether sulfate, polyoxyethylene polyoxypropylene oleyl ether sulfate, polyoxyethylene octylphenyl ether sulfate, polyoxyethylene nonylphenyl ether sulfate, polyoxyethylene polyoxypropylene nonylphenyl ether sulfate and the like, salts of sulfates of fatty acid esters, for example sulfate of polyoxyethylene caprylate, sulfate of polyoxyethylene caprate, sulfate of polyoxyethylene laurate, sulfate of polyoxyethylene myristate, sulfate of polyoxyethylene palmitate, sulfate of polyoxyethylene stearate, sulfate of polyoxyethylene oleate, sulfate of polyoxyethtylene polyoxypropylene laurate, sulfate of polyoxyethylene polyoxypropylene oleate, sulfate of glycerol caprylate, sulfate of glycerol caprate, sulfate of glycerol laurate, sulfate of glycerol myristate, sulfate of glycerol palmitate sulfate of glycerol stearate, sulfate of glycerol oleate, sulfate of sorbitan laurate, sulfate of sorbitan plamitate, sulfate of sorbitan stearate, sulfate of sorbitan oleate, sulfate of castor oil, sulfate of polyoxyethylene castor oil, alkane sulfonates, olefin sulfonates and petroleum sulfonates, for example paraffin sulfonate, $\alpha$-olefin sulfonate, internal-olefin sulfonate, petroleum sulfonate and the like, alkyl aryl sulfonates, for example octylbenzene sulfonate, nonylbenzene sulfonate, dodecylbenzene sulfonate, butylnapththalene sulfonate, octylphenol sulfonate, nonylphenol sulfonate and the like, sulfosuccinates, for example dihexyl sulfosuccinate, dioctyl sulfosuccinate, dinonyl sulfosuccinate, didecyl sulfosuccinate, ditridecyl sulfosuccinate, dioleyl sulfosuccinate and the like, $\alpha$-sulfo fatty acids and $\alpha$-sulfo fatty acid esters, for example $\alpha$-sulfo lauric acid, $\alpha$-sulfo myristic acid, $\alpha$-sulfo palmitic acid, $\alpha$-sulfo stearic acid, $\alpha$-sulfo coconut oil fatty acid, $\alpha$-sulfo tallow fatty acid, methyl $\alpha$-sulfo laurate, methyl $\alpha$-sulfo myristate, methyl $\alpha$-sulfo palmitate, methyl $\alpha$-sulfo stearate, isopropyl $\alpha$-sulfo stearate and the like, amide sulfonates and amide sulfates, for example N-methyl-N-oleoyl taurate, N-cyclohexyl-N-palmitoyl taurate, lauroyl monoethanolamide sulfate, polyoxyethylene lauramide sulfate and the like, alkyl phosphates and polyoxyalkylene alkyl ether phosphates, for example octyl phosphate, decyl phosphate, dodecyl phosphate, tridecyl phosphate, tetradecyl phosphate, hexadecyl phosphate, octadecyl phosphate, oleyl phosphate, polyoxyethylene dodecyl ether phosphate, polyoxyethylene oleyl ether phosphate, polyoxyethylene nonylphenyl ether phosphate and the like, and fatty acids and rosin, for example caprylic acid, capric acid, lauric acid, myristic acid, palmitic acid, stearic acid, oleic acid, coconut oil fatty acid, tallow fatty acid, hydrogenated tallow fatty acid, tall oil fatty acid, rosin and the like, etc.

Said salts include alkali metal salts such as lithium salts, sodium salts, potassium salts and the like, alkaline earth metal salts such as magnesium salts, calcium salts, barium salts and the like, ammonium salts and organic salts such as salts of amine, for example methyl amine, ethyl amine, n-propyl amine, iso-propylamine, n-butyl amine, sec-butyl amine, tert-butyl amine, iso-butyl amine, hexyl amine, octyl amine, decyl amine, dodecyl amine, tetradecyl amine, hexadecyl amine, octadecyl amine, oleyl amine, monoethanol amine, diethanol amine, triethanol amine, dimethylaminoethyl amine, diethylaminoethyl amine, dimethylaminopropyl amine, ethylene diamine, diethylene triamine, triethylene tetramine, 2-hydroxyethyl ethylene diamine and the like, etc.

Furthermore, said surface active agent includes cationic surface active agents such as alkyl amine salts of organic and inorganic acid, for example octyl amine acetate, decyl amine acetate, dodecyl amine acetate, tetradecyl amine acetate, hexadecyl amine acetate, octadecyl amine acetate, oleyl amine acetate, coconut oil alkyl amine acetate, tallow alkyl amine acetate, dodecyl dimethyl amine acetate, octadecyl dimethyl amine acetate, tallow alkyl propylenediamine acetate, dodecyl amine hydrochloride, octadecyl amine hydrochloride, coconut oil alkyl amine hydrochloride, tallow alkyl amine hydrochloride, dodecyl dimethyl amine hydrochloride, undecyl imidazoline acetate, quaternary ammonium salts, for example dodecyl trimethyl ammonium chloride, tetradecyl trimethyl ammonium chloride, hexadecyl trimethyl ammonium chloride, octadecyl trimethyl ammonium chloride, didodecyl dimethyl ammonium chloride, tridodecyl methyl ammonium chloride, dodecyl dimethyl benzyl ammonium chloride, tetradecyl dimethyl benzyl ammonium chloride, coconut oil alkyl trimethyl ammonium chloride, tallow alkyl trimethyl ammonium chloride, dodecyl pyridinium bromide, hexadecyl pyridinium bromide and the like, etc.

Still furthermore, said surface active agent also includes nonionic surface active agents such as polyoxyalkylene alkyl ethers and polyoxyalkylene alkylphenyl ethers, for example polyoxyethylene octyl ether, polyoxyethylene decyl ether, polyoxyethylene dodecyl ether, polyoxyethylene tridecyl ether, polyoxyethylene tetradecyl ether, polyoxyethylene hexadecyl ether, polyoxyethylene octadecyl ether, polyoxyethylene oleyl ether, polyoxyethylene polyoxypropylene dodecyl ether, polyoxyethylene polyoxypropylene tridecyl ether, polyoxyethylene polyoxypropylene hexadecyl ether, polyoxyethylene polyoxypropylene octadecyl ether, polyoxyethylene polyoxypropylene oleyl ether, polyoxyethylene octalphenyl ether, polyoxyethylene nonylphenyl ether, polyoxyalkylene alkyl amines, for example polyoxyethylene octyl amine, polyoxyethylene decyl amine, polyoxyethylene dodecyl amine, polyoxyethylene tetradecyl amine, polyoxyethylene hexadecyl amine, polyoxyethylene octadecyl amine, polyoxyethylene oleyl amine, polyoxyethylene polyoxypropylene dodecyl amine, polyoxyethylene polyoxypropylene octadecyl amine, polyoxyethylene polyoxypropylene ethylenediamine and the like, alkanolamides and polyoxyalkylene fatty acid amides, for example lauroyl monoethanolamide, lauroyl diethanolamide, myristoyl monoethanolamide, myristoyl diethanolamide, palmitoyl monoethanolamide, palmitoyl diethanolamide, stearoyl monoethanolamide, stearoyl diethanolamide, oleoyl monoethanolamide, fatty acid diethanolamide, tallow fatty acid monoethanolamide, oleoyl diethanolamide, coconut oil, lauroyl monoisopropanol amide, stearyl monoisopropanolamide, oleoyl monoisopropanolamide, polyoxyethylene lauramide, polyoxyethylene myristamide, polyoxyethylene palmitamide, polyoxyethylene stearamide, polyoxyethylene polyoxypropylene lauramide, polyoxyethylene polyoxypropylene stearamide and the like, polyoxyalkylene fatty acid esters, for example polyoxyethylene caprylate, polyoxyethylene caprate, polyoxyethylene laurate, polyoxyethylene myristate, polyoxyethylene palmitate, polyoxyethylene stearate, polyoxyethylene oleate, polyoxyethylene polyoxypropylene laurate, polyoxyethylene polyoxypropylene palmitate, polyoxyethylene polyoxypropylene stearate, polyoxyethylene polyoxypropylene oleate, polyoxyethylene lauryl ether palmitate, polyoxyethylene polyoxypropylene myristyl ether tallow fatty acid ester, polyoxyethylene nonylphenyl ether laurate and the like, and polyhydric alcohol fatty acid esters, for example glycerol monocaprylate, glycerol mono-caprate, glycerol mono-laurate, glycerol mono-myristate, glycerol mono-palmitate, glycerol mono-stearate, glycerol mono-oleate, sorbitan mono-laurate, sorbitan dilaurate, sorbitan trilaurate, sorbitan monopalmitate, sorbitan dipalmitate, sorbitan tripalmitate, sorbitan monostearate, sorbitan distearate, sorbitan tristearate, sorbitan monooleate, sorbitan dioleate, sorbitan trioleate, sucrose monolaurate, sucrose monopalmitate, sucrose monostearate, sucrose monooleate and the like, polyoxyalkylene ether of polyhydric alcohol fatty acid esters, for example polyoxyethylene ether of glycerol monooleate, polyoxyethylene ether of glycerol monostearate, polyoxyethylene ether of sorbitan monolaurate, polyoxyethylene ether of sorbitan monostearate, polyoxyethylene ether of sorbitan monooleate, polyoxyethylene polyoxypropylene ether of sorbitan monolaurate, polyoxyethylene ether of castor oil and the like, tertiary amine oxides, for example dodecyl dimethyl amine oxide, tetradecyl dimethyl amide oxide, hexadecyl dimethyl amide oxide, octadecyl dimethyl amine oxide, oleyl dimethyl amine oxide, tridodecyl amine oxide, trioctadecyl amine oxide, polyoxyethylene dodecyl amine oxide, polyoxyethylene octadecyl amine oxide, and polyoxyalkylene polyols, for example polyethylene glycol, polypropylene glycol, polyoxyethylene polyoxypropylene glycol and the like, etc.

Yet further, said surface active agent includes ampholytic surface active agents such as betaine derivatives, for example dodecyl dimethyl betaine, tetradecyl dimethyl betaine, coconut oil alkyl dimethyl betaine and the like, and amino acids, for example N-dodecyl glycine, N-dodecyl alanine and the like, etc.

Other surface active agents too numerous to mention are also suitable.

Of the surface active agents mentioned, it is possible to mix two or more of surface active agents together in preparing a suitable torque stabilizing agent. Preferable surface active agents for the invention are sulfosuccinates, alkyl amine salts of organic and inorganic acid, polyoxyalkylene alkyl ethers and polyoxyalkylene alkylphenyl ethers, polyoxyalkylene fatty acid esters and polyoxyalkylene ether of polyhydric alcohol fatty acid ester. A preferred surface active agent is polyoxyalkylene monoalkyl ether fatty acid ester.

Said film forming material and said surface active agent are conventionally dissolved in water or in a mixture of water and a water soluble solvent such as dioxane, methanol, ethanol, iso-propanol, acetone, ethyl cellosolve, n-butyl cellosolve and the like or a water insoluble solvent such as benzol, toluol, xylol, ethyl acetate, n-butyl acetate, methyl ethyl ketone, methyl iso-butyl ketone, kerosene, spindle oil and the like. The torque stabilizing agent may be made without a solvent when the film forming materials are liquid or able to melt upon heating. When the surface active agent of the invention is also employed as an emulsifier for a water insoluble polymer, the addition of more surface active agent may be omitted. If desired, other materials such as an anticorrosive agent, a cross-linking agent, a plasticizer, a pigment, a dyestuff and the like may be added to said mixture so long as they do not adversely affect the coefficient of friction.

In this manner the torque stabilizing agent of the invention is prepared. When said torque stabilizing agent is of the solution type, emulsion type or liquid type, said torque stabilizing agent is diluted with water, or with a mixture of water and a water soluble solvent or water insoluble solvent if desired. The diluted mixture is employed as the treating solution. Said treating solution conventionally includes about 2% to about 50% by weight of the polymer and about 2% to about 25% by weight of the surface active agent.

When the torque stabilizing agent is of the type that melts upon heating, the torque stabilizing agent may be employed in molten form or may be employed as a powder.

Said treating solution, treating liquid or treating molten material is applied to the surface of the fastener by brushing, spraying, dipping and the like, and then dried naturally or by heating, or cooled. Alternatively, the torque stabilizing agent may be applied to the body to which the fastener attaches. The torque stabilizing agent will then be applied to the fastener when the fastener comes in contact with said body.

When the torque stabilizing agent is a powder, the preferred method of application is by electrostatic coating or by fluidized bed coating. The amount of said torque stabilizing agent which is applied to the fastener surfaces is very small so that it causes no trouble to fit a tool onto the head of the fastener even when the torque stabilizing agent adheres to the head of the fastener. Even a small amount of said torque stabilizing agent exhibits a remarkable torque stabilizing effect in fastening parts.

The torque stabilizing agent will provide an optimal coefficient of friction despite pretreatment of the surface of the fastener, such as by plating, phosphate treatment, chromate treatment, zinc chromate treatment, metallizing of zinc chrome, aluminum, vanadium, niobium and the like, short-peeling and the like.

Thus, the layer comprising a mixture of said organic film forming material and about 2% to about 25% by weight of said surface active agent adheres to the surface of the fastener and said layer maintains the fixed coefficient of friction of the fastener within the range 0.1 to 0.2 regardless of the surface condition of the fastener such as the quality of the fastener, the surface pretreatment, the presence of an adherant on the fastener and the like. The torque stabilizing agent effectively prevents the defect of the fastening parts.

EXAMPLES

The following torque stabilizing agents were prepared.

No. 1

Water solution including 15% by weight of polyacrylic acid monoethanolamine salt and 2% by weight of polyoxyethylene (12 mol.) nonylphenyl ether.

No. 2

Water solution including 7% by weight of polyacrylic amide and 4% by weight of octadecylamine acetate.

No. 3

Mixture of 100 parts by weight of water solution including 17% by weight of copolymer (methyl acrylate:itaconic acid ammonium in a weight ratio of 70:30) and 3% by weight of sodium dioctyl sulfosuccinate, and 0.07% by weight of polyethylene glycol diglycidyl ether as a cross-linking agent.

No. 4

Mixture of 100 parts of water solution including 15% by weight of water soluble alkyd resin and 25% by weight of polyoxyethylene (20 mol.) sorbitan monolaurate, and 1% by weight of 1,3,5-triaminotoluol as an anticorrosion agent.

No. 5

Mixture of 100 parts of mineral oil solution including 5% by weight of carboxymethyl cellulose and 2% by weight of polyoxyethylene (5 mol.) polyoxypropylene (10 mol.) monooleate, 0.15% by weight of polyethyleneglycol as a plasticizer, and 0.02% by weight of methylol-melamine as a cross-linking agent.

No. 6

Mixture of 22% by weight of water emulsified alkyd resin (monoethanolamine salt) (Arolon 1 by Nippon Shokubai Kagaku Kogyo Co. Ltd.) and 3% by weight of polyoxypropylene (8 mol.) polyoxyethylene (11 mol.) myristyle ether tallow fatty acid ester.

Bolts (M 12 X 1.25) were dipped in each of the treating solutions, then heated at 70° C., for 30 minutes. The relation between the fastening torque (T) and the axial force (Q) of the treated bolts were measured with a bolt tester (Kawatetsu Meter Co. Ltd.).

Figure 1:
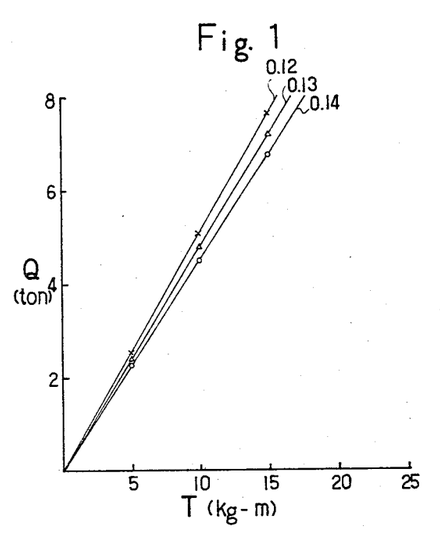
FIG. 1 to FIG. 6 show the relation between the fastening torque (T) and the axial force (Q) when torque stabilizing agents No. 1 to No. 6, described below, are applied to bolts.
Figure 2:
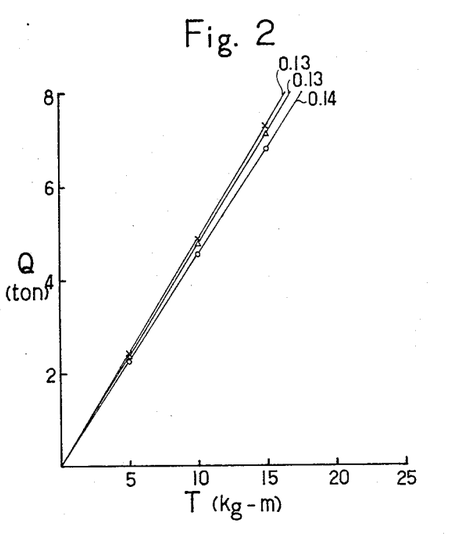
Figure 3:
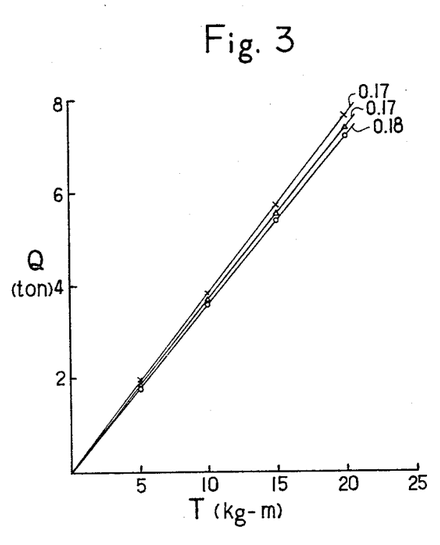
Figure 4:
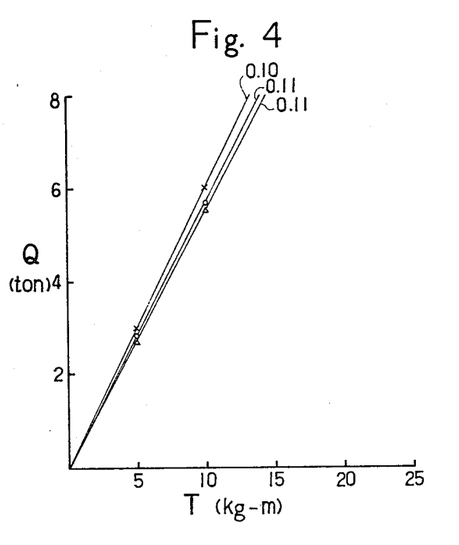
Figure 5:
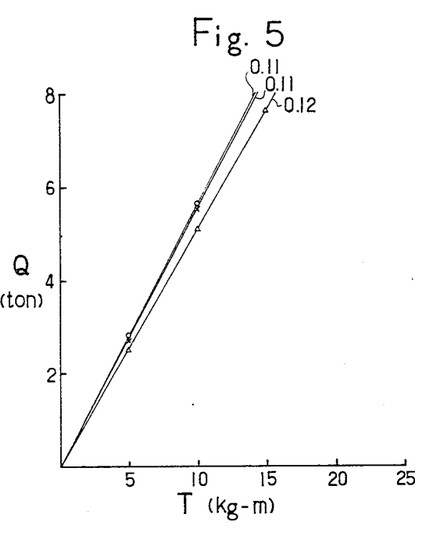
Figure 6:
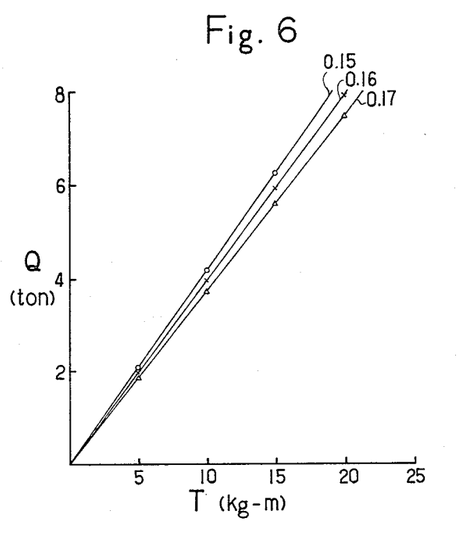
Figure 7:
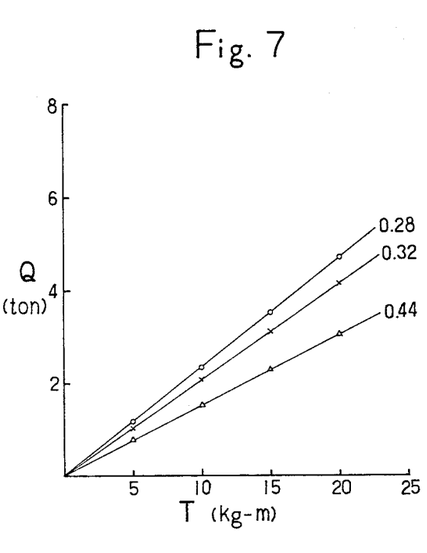
FIG. 7 shows the bolts without treatment with the torque stabilizing agents as a contrast.

FIG. 1 to FIG. 6 show the effect of treating the bolts with the torque stabilizing agent of this invention. FIG. 1 relates to agent No. 1. FIG. 2 relates to agent No. 2. FIG. 3 relates to agent No. 3. FIG. 4 relates to agent No. 4. FIG. 5 relates to agent No. 5. FIG. 6 relates to agent No. 6, and FIG. 7 shows the bolt without treatment as a contrast. The curve (o—o) shows the results when the bolts have been treated only with the torque stabilizing agent. The curve (x—x) shows the results when the bolts have been pretreated with zinc chromate before treatment with the torque stabilizing agent. The curve (Δ—Δ) shows the results when the bolts are zinc plated.

Figure 8:
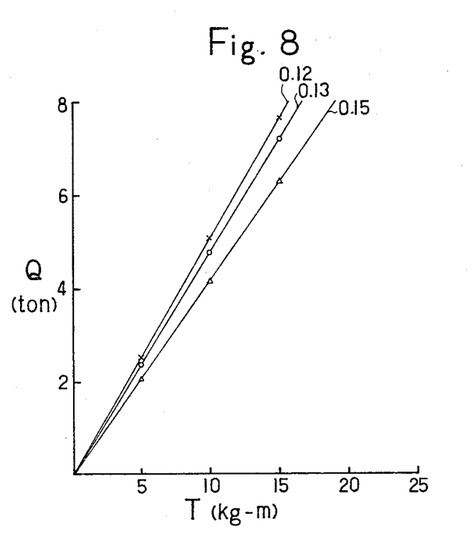
FIG. 8 to FIG. 13 show the relation between the fastening torque (T) and the axial force (Q) when torque stabilizing agents No. 1 to No. 6 are applied to bolts pretreated with an adherant.
Figure 9:
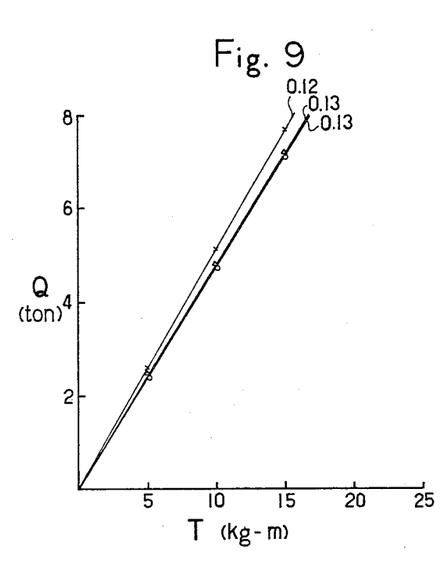
Figure 10:
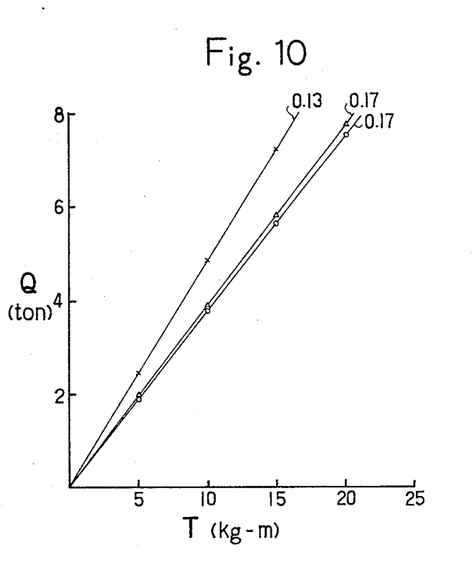
Figure 11:
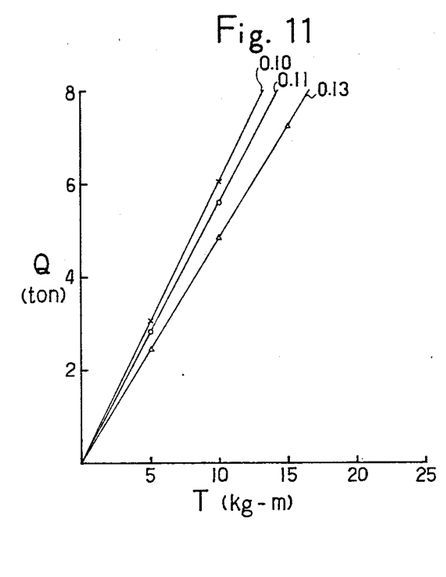
Figure 12:
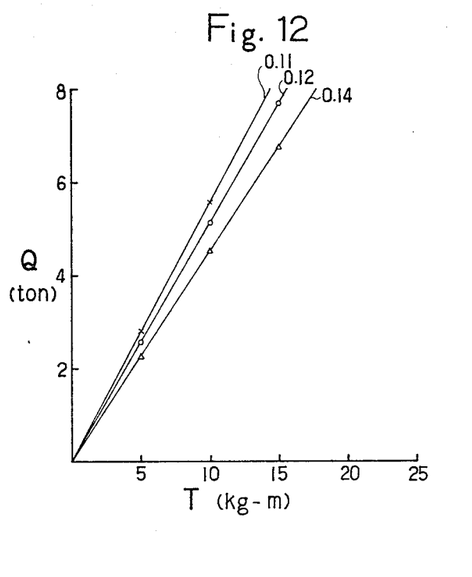
Figure 13:
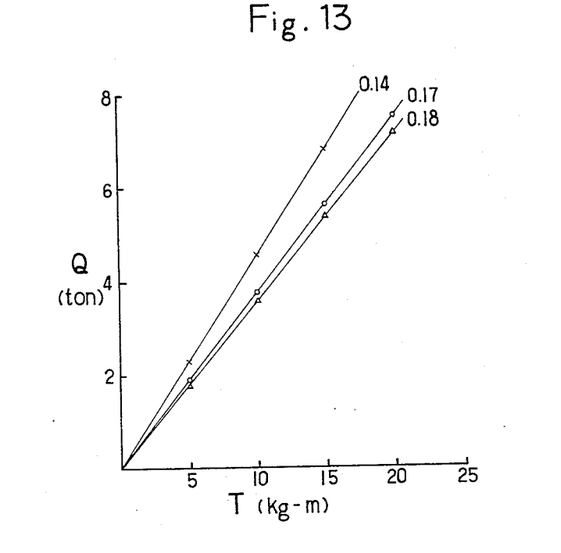
Figure 14:
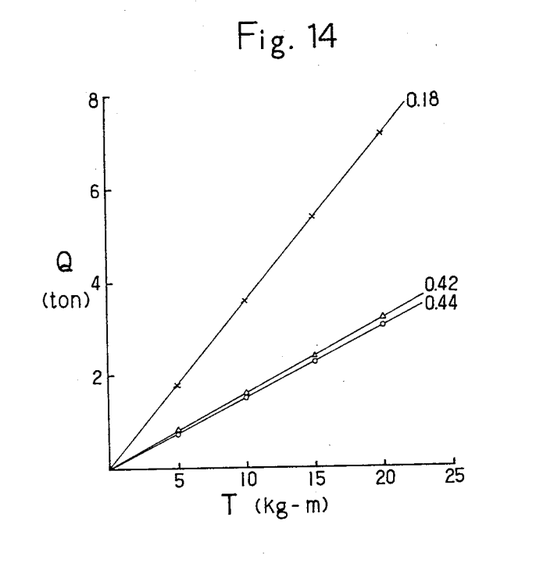
FIG. 14 shows the pretreated bolts without treatment with the torque stabilizing agents as a contrast.

FIG. 8 to FIG. 13 show the effect of the torque stabilizing agents on zinc plated bolts which have been pretreated with an adherant. FIG. 8 relates to agent No. 1. FIG. 9 relates to agent No. 2. FIG. 10 relates to agent No. 3. FIG. 11 relates to agent No. 4. FIG. 12 relates to agent No. 5, and FIG. 13 relates to agent No. 6. FIG. 14 relates to the zinc plated bolts without treatment with the torque stabilizing agent as a contrast. The curve (o—o) relates to bolts without pretreatment with an adherant. The curve (x—x) relates to bolts pretreated with spindle oil. The curve (Δ—Δ) relates to bolts pretreated with trichloroethylene.

Referring now to the figures showing the values of the coefficient of friction alongside the lines, it is clear from FIGS. 1 to 6 and 8 to 13 that each torque stabilizing agent of the present invention gives preferred values of between about 0.1 and about 0.2.

Referring now to FIG. 1 to FIG. 6, it is clear that the relation between T and Q is not affected by any surface condition in the case of the bolts treated with the torque stabilizing agent, while the relation between T and Q is remarkably affected by the surface condition in the case of bolts without treatment.

Referring now to FIG. 8 to FIG. 13, it is clear that the relation between T and Q is not affected by any pretreatment with an adherant in the case of bolts treated with the torque stabilizing agent while the relation between T and Q is remarkably affected by pretreatment with an adherant in the case of the bolt without treatment.

Referring now to FIG. 7 and FIG. 14 showing the values for the coefficient of friction of bolts not treated with the torque stabilizing agent, it is clear that the value is not within the optimum range of about 0.1 to about 0.2.

As a further contrast to the present invention, bolts were treated with a lubricating composition comprising 0.5 grams of a 55% suspension of polytetrafluoroethylene, 0.5 grams of a 30% suspension of polyethylene, 5.25 grams of water, and less than 1% by weight of a non-ionogenic emulsifier. In some cases, the bolts were zinc plated or were pretreated with zinc chromate or an adherant, such as spindle oil or trichloroethylene. In all cases, the coefficient of friction ranged from 0.06 to 0.08, well below the optimal range.

We claim:

1. A torque stabilizing agent for maintaining the coefficient of friction of threaded a metal or metal alloy fastener within the range of about 0.1 to about 0.2 comprising a film-forming water emulsifying alkyd resin and from about 2% to about 25% by weight of a polyoxyalkylene monoalkyl ether fatty acid ester surface active agent.

2. A method of stabilizing the torque of threaded a metal or metal alloy fastener comprising applying to the fastener a torque stabilizing agent comprising a film-forming water emulsifying alkyd resin and from about 2 to about 25% by weight of a polyoxyalkylene monoalkyl ether fatty acid ester, said torque stabilizing agent maintaining the coefficient of friction of said fastener within the range of about 0.1 to about 0.2, and drying the thus-treated fastener.

3. A torque stabilizing fastener comprising threaded a metal or metal alloy fastener coated with a torque stabilizing agent comprising a film-forming water emulsifying alkyd resin and from about 2% to about 25% by weight of a polyoxyalkylene monoalkyl ether fatty acid ester surface active agent.

* * * * *